United States Patent [19]

Satomi

[11] Patent Number: 4,657,636
[45] Date of Patent: Apr. 14, 1987

[54] HIGH DENSITY PULP SCREENING APPARATUS

[76] Inventor: Hitoshi Satomi, 12-25, Toro 2-chome, Shizuoka-shi, Shizuoka-ken, Japan

[21] Appl. No.: 776,455

[22] Filed: Sep. 16, 1985

[30] Foreign Application Priority Data

Jan. 28, 1985 [JP] Japan ................................. 60-14023

[51] Int. Cl.$^4$ .......................... D21D 5/04; B07B 1/04; B07B 1/42
[52] U.S. Cl. .................................... 162/261; 209/359; 210/413; 241/46.11; 241/46.17
[58] Field of Search .................... 162/261; 241/28, 43, 241/46.11, 46.17; 209/250, 268, 273, 353, 358, 359, 360, 361, 389; 210/319, 413; 366/296

[56] References Cited
U.S. PATENT DOCUMENTS 2,452,135 10/1948 Lowe ................................ 241/46.17
2,480,119 8/1949 Cram ..................................... 209/359

Primary Examiner—S. Leon Bashore
Assistant Examiner—Thi Dang
Attorney, Agent, or Firm—Parkhurst & Oliff

[57] ABSTRACT

A high density pulp slurry screening apparatus is disclosed which has a cylindrical casing including a first chamber in the center with an intake port for introducing unrefined pulp slurry and a discharge port for discharging foreign matters which have been separated from the pulp slurry and a pair of second chambers disposed on the sides of the first chamber for accepting the pulp slurry. The first chamber and each second chamber are divided by a screen plate with a plurality of screening apertures on the entire surface thereof for passing the refined pulp slurry from the first chamber into the second chamber. In the first chamber are provided a pair of stirring impellers rotating in the opposite directions for stirring and agitating the incoming pulp slurry and causing substantial turbulence to effect a uniform positive pressure distribution along the entire surface area of the screen plate and a smooth and efficient passage of the pulp slurry.

5 Claims, 8 Drawing Figures

HIGH DENSITY PULP SCREENING APPARATUS

BACKGROUND OF THE INVENTION

This invention relates to a high density pulp screening apparatus provided with first and second chambers in a papermaking machine or a waste paper processing machine, for example, and more particularly, to a high density pulp screening apparatus for facilitating dissociation and removal of foreign matters or substances from pulp by causing violent turbulence in the first chamber to effect refining operation of the high density pulp.

There are number of pulp screening apparatus generally known in a prior art adapted specifically to refine and screen the high density pulp in form of slurry or suspension, called hereinbelow pulp slurry. One typical prior art pulp screening apparatus is described hereunder in conjunction with FIG. 1, in which a pulp screening apparatus for use in a waste paper processing machine, for example, comprises a casing of generally cylindrical configuration. Within the casing is disposed a screen plate 20 vertically as viewed in FIG. 1 so as to define first and second chambers 21 and 22 on both sides of the screen plate 20 in the casing, and an impeller 23 provided with two blades extending in opposite directions is disposed adjacent to the screen plate 20 in the first chamber 21. The impeller 23 is rotated in the first chamber 22 by a drive mechanism, generally an electric motor 18 connected through a shaft 14 extending across the second chamber 22 to stir pulp slurry inside the first chamber 21.

An intake port 2 for introducing the pulp slurry is provided on the wall of the first chamber 21 directly facing the central portion of the impeller 23 and a discharge port 3 is also provided on the circumferential wall thereof for removing heavy foreign matters therethrough separated from the pulp slurry.

In the second chamber 22 a delivery port 7 is provided on the wall thereof for transferring the refined pulp slurry as an accepted stock.

The impeller used herein comprises a round boss 25 in the central portion and a pair of stirring blades which are extending from the boss into a diameterically opposed directions. The width of the blade generally diminishes from one end adjacent to the boss 25 to the other end farther from the boss. The above-described prior type pulp screening apparatus operates in the following manner.

When the impeller 23 is driven and rotated by the motor 18, the pulp slurry is agitated in the first chamber 21. As the blades of the impeller 23 move forward, the generally flat front face thereof propels the pulp slurry forward and forces the same into the screen plate 20.

The screen plate, in the meantime, is provided with a number of longitudinal slit openings 10 in a properly spaced and parallel relationship to one another for filtering the pulp slurry.

In the forward area of the impeller blade the pulp slurry is shoved and forced into the slit openings 10. On the contrary, in the rearward area of the blade, i.e. in the rear of the flat front face, negative pressure is generated and thus a portion of the pulp slurry which had entered into the second chamber 22 is dragged back into the first chamber. This reverse flow helps to keep the slit openings 10 from being clogged and permits continuous passing of the pulp slurry for screening operation.

The pulp slurry which has been transferred from the first chamber 21 into the second chamber 22 through the screen plate 20 is judged to be accepted and is then discharged from the delivery port 7 of the second chamber for further processing.

Meanwhile, the foreign matters and particles which have failed to pass the screen plate 20 are drained out from the discharge port 3.

In order to assure the continuous screening operation the pulp slurry must be uniformly agitated by means of the impeller 23.

However, the effect of agitation becomes weak as the distance from the impeller becomes larger, and this tendency becomes stronger with the density of the pulp slurry which is supplied. This effect of agitation is manifest at the farthest portion of the impeller and causes the slurry flow to be stagnant, which may adversely lead to a dehydrated condition of the pulp and eventually may result in clogging of the slit openings 10 of the screen plate 20. To prevent such clogging phenomenon, the impeller 23 must be rotated at a high velocity of about 30 m/sec. at the periphery, for example and yet, the maximum density of the pulp slurry within the disposable limit was about 3 percent.

Also with respect to the prior art pulp screen apparatus, with a single impeller rotating in one direction, the first chamber becomes a forced vortex chamber. This causes the pulp slurry to flow and strike the screen surface from an oblique direction. The oblique entry of the pulp slurry degrades the efficiency in the screening performance.

Furthermore, the first chamber has such a pressure distribution that the pressure becomes lower towards the central portion thereof and becomes higher towards the peripheral portion thereof, with the accelerated pressure increase from the center towards the outer periphery as shown in FIG. 2. Thus, the screening capacity of the screening plate is greater towards the outer portion and becomes reduced at the central portion thereof.

SUMMARY OF THE INVENTION

An object of the invention is to provide a pulp screening apparatus with a highly improved screening performance.

Another object of the invention is to provide a pulp screening apparatus which can effect better dissociation and separation of foreign matters.

According to this invention there is provided a high density pulp screening apparatus comprising a casing provided with a first chamber, a pair of second chambers disposed on both sides of the first chamber in generally symmetrical locations, and a pair of symmetrically disposed impellers provided inside the first chamber and having rotational shafts extending through the respective second chambers and connected to electric motors for driving the impellers. The pair of impellers are driven in the opposite directions in order to impart a stable and well-balanced turbulence to the pulp slurry inside the first chamber. The turbulence enables to keep a more uniform and homogeneous blend of the pulp slurry, which further ensures processing of much denser pulp slurry.

According to this invention constructed as described hereinabove, the turbulence caused by the impellers gives the pulp slurry the flow parallel to the axial direction of the slit openings or apertures of the screen plate, which leads to a much smoother passage of the pulp slurry through the apertures with higher effectiveness.

The turbulence also permits even pressure distribution within the first chamber and allows more uniform passage of the pulp slurry, resulting in efficient use of the slit openings of the screen plate.

The capacity of refining or screening is more than doubled by means of the provision of the pair of screen plates as compared with a single screen plate in the prior art.

This invention is further described with the aid of the accompanying drawings, which illustrate a preferred embodiment by way of example only. The nature, utility and features of this invention will be more clearly apparent from the following detailed description with respect to the preferred embodiment when read in conjunction with the accompanying drawings briefly described below.

DETAILED DESCRIPTION OF THE PREFERRED EMBODIMENT

Figure 3:
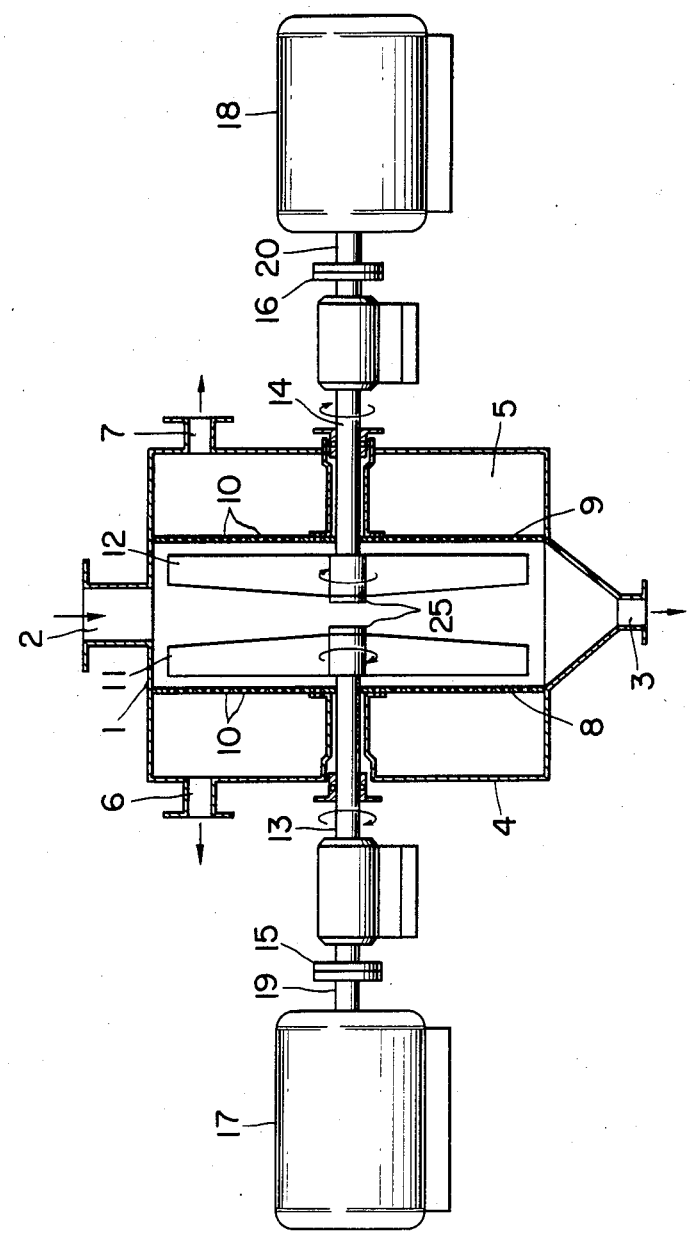
FIG. 3 shows a schematic view, partially in section, of one embodiment of the high density pulp screening apparatus according to this invention.

Referring first to FIG. 3, an improved high density pulp screening apparatus of this invention, in a waste paper processing machine, for example, has a cylindrical casing including a first cylindrical chamber 1 and second cylindrical chambers 4 and 5. The first chamber 1 is located approximately in the central portion of the whole apparatus and provided with an intake port 2 for introducing the pulp slurry to be refined or screened and a discharge port 3 for discharging the heavy and foreign matters or articles which have been separated from the introduced pulp slurry. A pair of second chambers 4 and 5 are disposed on the sides of the first chamber 1. The first chamber 1 and the second chamber 4 are divided by a screen plate 8, and also, the first chamber 1 and the second chamber 5 are divided by a screen plate 9. Each of the screen plates 8 and 9 has a number of slit apertures or openings 10 each having a diameter of 0.1 to 0.5 mm for the purpose of screening the pulp slurry on the entire surface thereof. The aperture 10 is formed in such a manner that it has a plurality of slit openings on the surface adjacent to the impeller. The inner dimension of the slit opening gradually increases as the opening is away from the impeller 11(12) until the inner dimension reaches the maximum at the other surface of the screen plate 8(9), so that it allows no entry of larger articles and foreign matters from the first chamber into the second chamber. On the other hand, it does not hinder entry of pulp slurry or finer substances, but even allows smooth flow through the slit openings because of the expanding passage. It should be noted that instead of providing a plurality of slit openings 10, a plurality of round apertures with the diameter less than 0.5 mm can be provided. The second chamber 4 is provided with a delivery port 6 for delivering the pulp slurry which has passed through the apertures 10 on the screen plate 8 and the impure materials or substances which were too big or heavy to pass through the apertures 10 have been refined. Likewise, the second chamber 5 is provided with a delivery port 7 for delivering the pulp slurry for further transfer.

Figure 4:
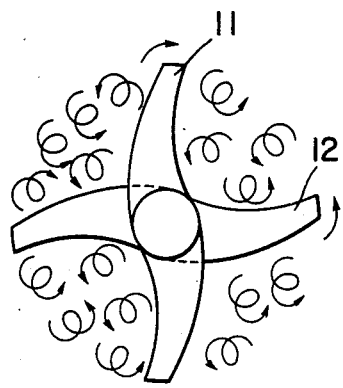
FIG. 4 is the turbulence caused in the flow of the pulp slurry with respect to the pair of impellers shown in FIG. 3.

In the first chamber 1 are provided a pair of impellers 11 and 12 to stir or agitate the pulp slurry supplied therein in the manner as shown in FIG. 4. The impeller 11 is connected with a connecting shaft 13 which has a coupling joint 15. The coupling joint 15 is further connected to a driving motor 17 through a driving shaft 19, so that the impeller 11 can be driven by the motor 17 via the driving shaft 19, the coupling joint 15 and the connecting shaft 13.

Similarly, the impeller 12 is connected with a connecting shaft 14 which has a coupling joint 16. The coupling joint 16 is further connected to a driving motor 18 through a driving shaft 20, so that the impeller 12 can be driven by the motor 18 via the driving shaft 20, the coupling joint 16 and the connecting shaft 14.

Figure 5:
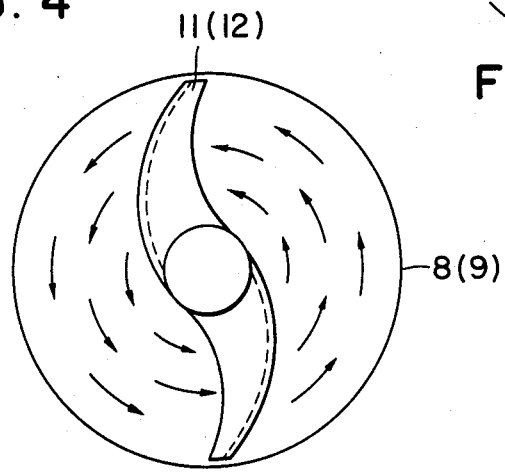
FIG. 5 is the elevational view of one impeller located in a first chamber of the screening apparatus shown in FIG. 3.

As shown in FIG. 5, the blade of impeller 11(12) is formed in such a shape that the blade has a generally round and convex front face and a generally round and concave back face on both ends of the central boss 25. The impellers 11 and 12 are so constructed that these impellers are rotated in the opposite directions (FIG. 4), one being in the clockwise direction and the other being in the counterclockwise direction by the corresponding driving motors 17 and 18 to cause the turbulence flow in the first chamber.

Figure 6:
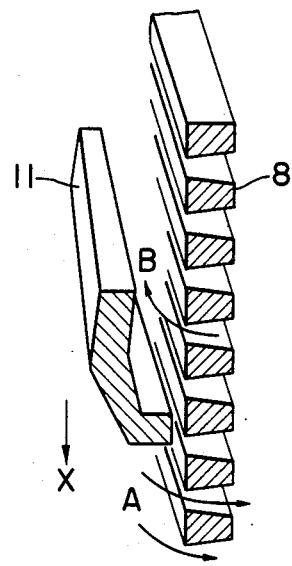
FIG. 6 is a sectional view of a part of the impeller and a part of the screen plate provided with a number of slit openings on an enlarged scale.

Referring next to FIG. 6, the blade of the impeller 11 is shown in section in relation to the screen plate 8. As shown in the figure, the blade comprises a portion substantially parallel to the moving direction thereof shown in the solid arrow X and a portion extending generally vertical to the moving direction.

During the rotational movement, the blade produces a positive pressure in front of its front face at a portion designated by the letter A, and at the same time, produces a negative or reduced pressure in the rear of the front face at a portion designated by the letter B. Therefore, the pulp slurry in front of the blade is displaced and forced into the apertures 10 of the screen plate 8, and in the meantime, at the back of the front face, a portion of the pulp slurry on the other side of the screen plate is drawn into the offset portion of the blade. This process not only permits efficient cleaning of the apertures of the screen plate, but also permits continuous feed or passage of the pulp slurry into the other side of the screen plate 8, i.e. the second chamber.

Figure 1:
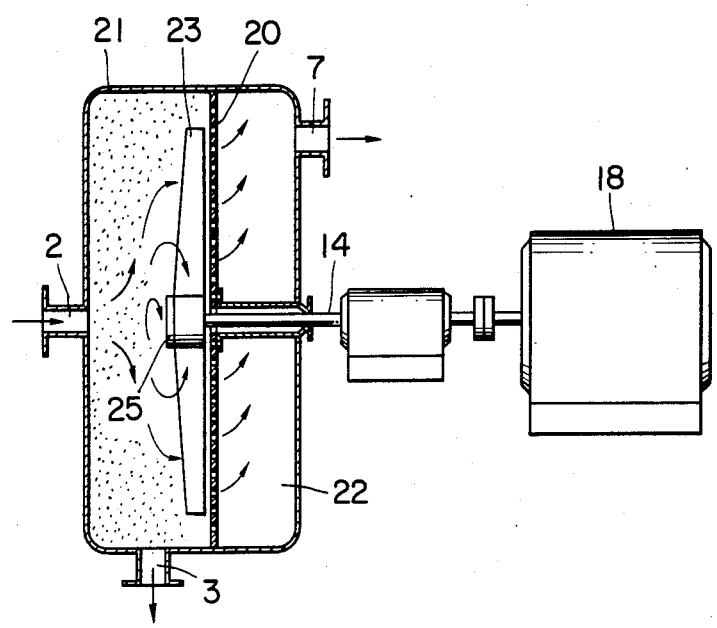
FIG. 1 shows a schematic view, partially in section, of a screening device of prior art.
Figure 2:
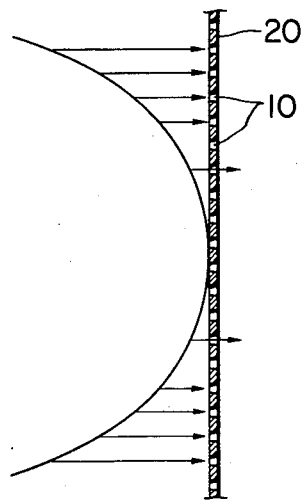
FIG. 2 shows the pressure distribution along the radial cross section of the screen plate according to the prior art.
Figure 7:
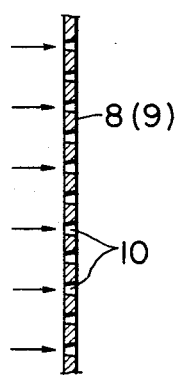
FIG. 7 shows the pressure distribution along the radial cross section of the screen plate.
Figure 8:
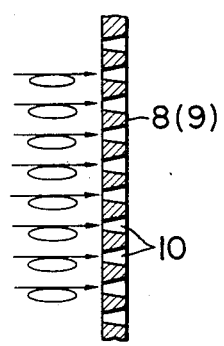
FIG. 8 is a radial cross sectional view showing the turbulent flow in the pulp slurry and the of the pulp slurry into the slit openings of the screen plate.

As shown in FIG. 4, since the impellers 11 and 12 are rotated in the opposite directions, the pulp slurry inside the first chamber 1 is subjected to the violent turbulence; as a result, the pressure distribution inside the first chamber 1 along the radial direction of the screen plates 8 and 9 becomes substantially uniform, as shown in FIG. 7, in which the length of solid arrow corresponds to the magnitude of the positive pressure at each location, which would be compared with FIG. 2.

Even more importantly, the turbulence in the pulp slurry flow enables the slurry to move substantially in the direction perpendicular to the screen plate or in the direction parallel to the axis of the apertures 10. Naturally, this ensures enhanced effectiveness of the pulp slurry passage and improved and enlarged areas of use of the screen plate 8 and 9.

As thus described, when the pulp slurry is introduced from the intake port 2 into the first chamber 1, it is stirred or agitated violently by means of the pair of impellers 11 and 12 which are rotated in the opposite directions. With the aid of the turbulence flow caused by the impellers 11 and 12, the pulp slurry is forced to pass through the plurality of slit apertures 10 and enter the second chambers 4 and 5 thus being refined or purified. On the other hand, any foreign or heavy matters and articles mingled in the pulp slurry are blocked from passage by the fine apertures 10 of the screen plates 8 and 9 and removed therefrom. These articles are discharged from the discharge port 3.

It is apparent from the foregoing that, according to the present invention, it is possible to cause a stable and uniform turbulence and agitation of the pulp slurry inside the first chamber, with a substantially uniform pressure distribution along the entire screening surface of the screen plates. It is also possible to achieve processing of highly dense pulp slurry to the extent of about 5% in density. It is further possible to cause heavy foreign matter among the materials to achieve a quicker dissociation of the pulp slurry and other materials or substances.

While this invention is susceptible of embodiment in many different forms there is shown in the drawings and described in detail a specific embodiment, with the understanding that the present disclosure is to be considered as an exemplification of the principles of the invention and is not intended to limit the invention to the particular embodiment illustrated.

What is claimed is:

1. A high density pulp screening apparatus comprising:
    a casing of generally cylindrical configuration provided with a first chamber having an intake port for introducing pulp slurry to be screened and a discharge port for discharging undesired substances separated from the pulp slurry and a pair of second chambers disposed on both sides of said first chamber for accepting refined pulp slurry each one of said second chambers having a delivery port;
    a pair of screen plates each disposed between said first chamber and the respective second chambers to define said first and second chambers in said casing, said pair of screen plates being provided with a plurality of apertures through which the refined pulp slurry passes from said first chamber into said respective second chambers;
    a pair of impellers provided in the first chamber and disposed adjacent to said screen plates, respectively; and
    drive means operatively connected to said impellers to rotate the same in opposite directions to each other through drive shafts disposed across said second chambers.

2. The screening apparatus as set forth in claim 1 wherein each of said impeller includes a boss in the central portion thereof and a pair of blades disposed at diametrically opposite ends of said boss, each of said blade having a generally flat portion which is substantially parallel to said screen plate and extends from the boss to the farthest end of said blade with gradually reducing width, and a portion bent down from said flat portion substantially perpendicular to said screen plate, said perpendicular portion forming the foremost portion of the blade to stir or agitate the pulp slurry.

3. The screening apparatus as set forth in claim 1 wherein the plurality of apertures of said screen plate comprise elongate slits extending from one end of said screen plate to the other end thereof.

4. The screening apparatus as set forth in claim 1 wherein the plurality of apertures of said screen plate comprise round apertures.

5. The screen apparatus as set forth in claim 4 wherein the round apertures of said screen plate has a first end open to said first chamber and a second end open to said second chamber, said first end of the apertures having a first diameter and said second end of the apertures having a second diameter which is larger than the first diameter with the diameter of the apertures gradually expanding from the first end to the second end.

* * * * *